United States Patent [19]

Danielson et al.

[11] 4,409,255

[45] Oct. 11, 1983

[54] COLD WATER SOLUBLE GELATIN AND PROCESS

[75] Inventors: Robert L. Danielson; Peter M. Bosco, both of Brookfield Center, Conn.

[73] Assignee: Nabisco Brands, Inc., Parsippany, N.J.

[21] Appl. No.: 350,559

[22] Filed: Feb. 22, 1982

[51] Int. Cl.³ ............................ A23L 1/04; A23J 1/10; A23J 3/00

[52] U.S. Cl. .................................. 426/576; 426/457; 426/468; 426/471

[58] Field of Search ................ 426/576, 457, 468, 471

[56] References Cited

U.S. PATENT DOCUMENTS 2,948,622  8/1960  Cahn ..................................... 426/576
3,927,221  12/1975  Kalafatas et al. ..................... 426/576

FOREIGN PATENT DOCUMENTS 1255391  12/1971  United Kingdom ................ 426/576

*Primary Examiner*—Jeanette M. Hunter
*Attorney, Agent, or Firm*—Richard Kornutik

[57] ABSTRACT

An improved cold water soluble gelatin and a process for preparing it. An aqueous solution comprising gelatin and a mixture of corn syrup solids and maltodextrin is dried. The total weight of the corn syrup solids and maltodextrin in the solution will be from 3 to 7 times the weight of gelatin, and the ratio of corn syrup solids to maltodextrin will be within the range of from 1:9 to 9:1. The resulting product is rapidly soluble in cold water, preferably dissolving in water at 55° F. in less than one minute of spoon stirring.

21 Claims, No Drawings

COLD WATER SOLUBLE GELATIN AND PROCESS

BACKGROUND OF THE INVENTION

The present invention relates to cold water soluble gelatin; and, particularly, to an improved cold water soluble gelatin product and a process for preparing it.

Gelatin is a widely used food ingredient. It has the ability to thicken or otherwise improve the texture of a variety of liquid products and also to set to a heat reversible gel which is useful in preparing products such as gelatin desserts. In products such as salad dressings, it aids in suspending particulate ingredients, and in frozen products such as ice cream it has the ability to retard the growth of ice crystals.

The art has long recognized a need for cold water soluble gelatin products. Unfortunately, it has been difficult until this time to achieve good solubility for gelatin in cold water. One area in particular where cold water solubility would be desirable is for the preparation of gelatin dessert mixes. There is a growing demand for all categories of food products which can be fully prepared and ready for consumption in the shortest period of time. The vast majority of gelatin dessert mixes which are currently available require the use of hot water to dissolve the gelatin and extended times, on the order of from about 2 to about 4 hours, to permit them to achieve the proper consistency for eating. Thus, these products are often viewed as inconvenient because they require the use of hot water and also because of the extended setting time before they can be enjoyed. Because of this, many consumers who enjoy eating gelatin desserts and salads prepared with them forego their use because they perceive them as too inconvenient.

This problem was recognized by Hagerty in U.S. Pat. No. 2,803,548 wherein he disclosed that a room-temperature soluble gelatin could be prepared by drying a gelatin solution at reduced pressure within a relatively narrow temperature range of between 37° C. and 70° C. According to his procedure, an aqueous gelatin solution, preferably containing a sugar such as sucrose, was first prepared by heating and was then dried at the indicated temperatures at a pressure of from 50 to 100 millimeters of mercury. The disclosure emphasizes the need to dry at the indicated temperatures and states where dextrose or corn syrup are substituted for the sucrose, a dense, rather than fluffy, product is produced. While the patent suggests that the material is soluble in cold water, no specific details as to water temperature or time for solution are given. The patent does indicate, however, that gel strength of products prepared according to the disclosure are about 10% less than those prepared by conventional techniques.

In U.S. Pat. No. 2,948,622, Cahn discloses that a hot solution comprising about one part gelatin, nine parts sugar, and 10 parts water can be dried as a thin film, and that the dry product is soluble in cold tap water. Contrary to the disclosure of Hagerty, Cahn indicates that the temperature should be between 70° C. and 120° C. and the pressure should be near atmospheric. He indicates, however, that pressures down to about 0.75 atmospheres can also be employed. While the exact conditions of dissolution of the final product in cold water are not given, it is indicated that the product of at least one example can be dissolved in cold water and then fully set by cooling for about 45 minutes at a temperature of 10° C.

In addition to the batch drying process of Hagerty and the atmospheric drum drying process of Cahn, these two workers together disclosed in U.S. Pat. No. 2,841,498 that a cold water soluble gelatin could be prepared by spray drying in aqueous solution of sucrose and gelatin, provided that the sucrose content was at least 8 times, and preferably on the order of 9 or 10 times, the gelatin content. This disclosure is very specific as to the need for sugar to be sucrose and that the sucrose be present in a specific concentration. While other sugars such as dextrose and corn syrup solids are disclosed, they are mentioned only for admixture with the spray dried product. Cahn and Hagerty disclose that after dissolving their product in cold water, it sets to a gel within between about 7 and 15 minutes when cooled to about 32° F., and a solution at 75° F. when placed in an ordinary kitchen refrigerator sets to a firm gel therein in about one and one-half hours. It is disclosed that the acid component can be included prior to drying if desired.

In Canadian Pat. No. 896,965 to de Boer and U.S. Pat. No. 3,904,771 to Donnelly et al, there are described procedures for preparing various cold water soluble gelatin products by spray drying solutions comprising gelatin and an acid. Donnelly et al disclose that in addition to the acid which is employed at a level of from about 30 to 200% by weight of gelatin, the solution can contain a sugar such as fructose or sucrose prior to spray drying. In the Canadian patent, however, de Boer indicates that sugar can be eliminated from the spray drying solution where the acid is employed at a level of from about 5 to about 20% based upon the weight of the gelatin. According to de Boer, spray drying the dilutely acid gelatin solution permits the formation of fine droplets for enhanced drying.

According to the disclosure of Kalafatas in U.S. Pat. No. 3,927,221, the need for elaborate or extensive drying systems of the type described in U.S. Pat. Nos. 2,803,548, 2,841,498, and 2,948,622 can be obviated by the use of an extrusion process. According to this disclosure, the cold water soluble gelatin composition is prepared by subjecting a sugar/gelatin admixture to heat and pressure while applying shearing forces to the admixture in an extruder. The products are said to dissolve in water at about 50° F. after 2 minutes of spoon stirring. The solutions prepared in this manner are set after about two hours refrigeration, as compared to about four hours when hot water is used to dissolve conventional gelatin dessert mixes. The disclosure incidentally mentions the use of dispersants, wetting agents and emulsifiers to enhance dispersibility. Similarly, U.S. Pat. No. 2,819,970 to Steigmann and U.S. Pat. No. 2,819,971 to Gunthardt also mention the use of additives of this type.

There remains a need for cold water soluble gelatin which can be rapidly, completely dissolved in cold tap water to provide a clear, high quality gelatin product and for a commercially efficient process for preparing it.

SUMMARY OF THE INVENTION

It is an object of the present invention to provide a gelatin product which is completely dispersed and dissolved in cold water.

It is another object of the present invention to provide a cold water soluble gelatin product which, after dissolution in cold water, forms a gel of good strength and high quality in a conveniently short period of time.

It is another and more specific object of the present invention to provide a gelatin dessert mix which can be fully dissolved in tap water at 55° F. with one minute of spoon stirring and then set to a high quality dessert in a conveniently short period of refrigeration.

It is another object of the present invention to provide a new process for preparing a cold water soluble gelatin product.

It is yet another and more specific object of the present invention to provide a process for preparing a cold water soluble gelatin product which is completely dissolved in cold tap water and is then fully set to form a high quality gel within a conveniently short period of refrigeration.

These and other objects are achieved according to at least the preferred embodiments of the present invention which provides a process for preparing a cold water soluble gelatin product, the product of that process, and a gelatin dessert mix which is fully soluble in cold water. The process according to the invention comprises: preparing an aqueous solution comprising gelatin, corn syrup solids and maltodextrin and drying the solution. The product of this process is useful in all applications where cold water solubility would be advantageous, and it is particularly useful in the preparation of gelatin dessert mixes which are fully soluble in cold water. The dessert mixes according to the present invention include acid, buffer, flavor and color, in addition to the cold water soluble gelatin prepared according to the process of the invention.

DETAILED DESCRIPTION OF THE INVENTION

The cold water soluble gelatin product prepared according to the present invention finds particular utility in gelatin dessert mixes, and will therefore be described in this environment as exemplary. This is not meant to imply, however, that other applications of the product are not intended. In fact, the products of the invention will be very useful in the preparation of salad dressings, ice cream, cake and pie mixes which require no baking, candies, and a wide variety of food products which currently employ gelatin or gelatin-like materials.

As a matter of definition, the term "cold water soluble" as used in the present application will be intended to mean that the product can be dissolved in water at 55° F. at the indicated concentration of usage. Preferably, this is accomplished in less than 5 minutes, and preferably less than 1 minute, by stirring with a spoon to provide moderate agitation. However, some formulations require high shear mixing, such as in a kitchen blender. Also by way of definition, all parts and percentages used throughout this disclosure are on a weight to weight basis, unless the contrary is indicated at the point of usage.

The particular type of gelatin employed is selected primarily upon the intended use of the ultimate product, and not for any particular functionality of the gelatin within the process of the invention. Therefore, the cold water soluble gelatin products of this invention can be prepared from gelatins of either the Type A (acid) or Type B (alkali) forms. Similarly, the gelatin can be prepared from any collagen source including bone, hide and other collagen sources and can be derived from any suitable animal, including beef and pork sources. Where the cold water soluble gelatin of the invention is intended for use in gelatin dessert mixes, the gelatin will preferably be a pork Type A gelatin. The bloom will typically be within the range of from about 150 to about 275.

According to the process, an aqueous solution comprising gelatin, maltodextrin and corn syrup solids is dried, preferably under reduced pressure or other conditions effective to provide a low density product. While any apparatus capable of performing the drying operation can be employed, vacuum drum dryers, spray dryers capable of drying foams, and the like, are preferred. These dryers should be capable of handling high volumes of material at practical solids concentrations to achieve rapid drying. The maltodextrin and corn syrup solids are products derived from the hydrolysis of starch, typically corn starch. As known to the art, corn syrups are generally those materials with DE values of 28 and greater, while maltodextrins will have DE values of from 13–23. However, the art also includes lower DE materials within the term maltodextrin. Thus corn dextrins having DE values of 1–13 are often included within this term and the present invention uses it accordingly. Also, materials with DE values between 23 and 28 are includable under either group. Corn syrup solids having DE values of 42 and below are preferred. Desirably, the ratio of the weight of corn syrup solids to maltodextrins will be within the range of from 1:9 to 9:1.

To prepare the solution for drying, the gelatin, corn syrup solids and maltodextrin are heated in the desired concentration in water, preferably to a temperature of about 150° to 160° F., to achieve complete solution. Typically, this is conducted by dissolving the gelatin in water first and then adding the corn syrup solids, and finally adding the maltodextrin to the solution. Advantageously, a gelatin solution from a gelatin production process, typically containing about 15 to 20% gelatin can be mixed with dry sugars including corn syrup solids and maltodextrin or concentrated solutions of either or both of these to achieve the desired concentration. The gelatin concentration will typically be within the range of from about 5 to about 25%, and the combined weight sugars including corn syrup solids and maltodextrin will typically be within the range of from about 20 to about 80%, these percentages based on the weight of the total solution. The ratio of the total weight of corn syrup solids and maltodextrin and other sugars to gelatin is critical from a processing standpoint and will typically be within the range of from greater than 2:1 up to about 12:1, and preferably will be within the range of from about 3–7:1. The total solids concentration of the solution for drying, including these and any other solid materials, will typically be within the range of from about 20 to about 75%.

In addition to the corn syrup solids and maltodextrins, other sugars can be employed at levels up to about 70% of the total sugars, including corn syrup solids and maltodextrins. However, it is preferred that the corn syrup solids and maltodextrin together comprise at least a major proportion of the sugars. The term "sugar" as it is employed in the present context is to be understood as meaning any of a number of useful saccharide materials which are capable of being dried under the conditions of processing to provide a degree of cold water solubility. Preferences for a specific material based upon its affinity for water or its contribution to the sweetness or the texture of the final product will control the final selection. Included in the list of useful sugars are monosaccharides, disaccharides, and polysaccharides and their degradation products; e.g., pentoses, including aldol pentoses, methyl pentoses, keto pentoses, like xylose and arabinose; a dioxy aldoses like rhamnose, hexoses and reducing saccharides such as aldo hexoses like glucose, galactose and mannose; and keto hexoses, like fructose and sorbose; disaccharides, like lactose and maltose; non-reducing disaccharides such as sucrose; and other polysaccharides such as raffinose.

In addition to the gelatin and the sugars, the aqueous solution for drying can also comprise an acid suitable for food use such as fumaric, citric, malic, adipic, ascorbic, tartaric, succinic, and phosphoric acids. Among these, fumaric and adipic acids are preferred. The acid, when employed, is found to improve final product solubility and will typically be present in a ratio of acid to gelatin within the range of from about 0.05–0.5:1. More preferred ratios of acid to gelatin will be within the range of from about 0.18–0.28:1 and significantly improve product solubility and can provide all the acid that is required for a good tasting gelatin dessert. Where the acid is employed in the solution prior to drying, it may sometimes also be desirable to employ a suitable buffer such as a sodium or potassium salt of any of the above mentioned acids. Preferably, the acid is added to the gelatin solution prior to adding the corn syrup solids and maltodextrin. The pH may be adjusted to within the range of from about 3 to about 4.5 by use of the buffering salts.

According to a preferred embodiment of the invention, the solution prior to drying will also contain a surface-active agent, such as those known generically to the art as polysorbates, hydroxylated lecithin, acetylated monoglycerides, succinylated monoglycerides, ethoxylated mono- and diglycerides, sodium stearoyl 2-lactylate and the like. These surface-active agents will be employed in amounts effective to render the dried product more easily dispersible in cold water. Exemplary of the polysorbate surface-active agents are polysorbate 60, polysorbate 65 and polysorbate 80. Polysorbate 60 is identified chemically as polyoxyethylene (20) sorbitan monostearate while polysorbate 65 is known as polyoxyethylene (20) sorbitan tristearate, and polysorbate 80 is known as polyoxyethylene (20) sorbitan monooleate. In addition to these materials, other surface-active agents which have the ability of increasing the dispersibility of the final product in cold water can also be employed. While the exact level of addition will be controlled based upon a balance between cost, effectiveness and taste, it is preferred to maintain the level within the range of from about 0.05 to about 7% based upon the weight of the gelatin to provide the desired degree of improvement in dispersibility without adversely affecting the ultimate rate of set or gel strength of the cold water soluble gelatin product produced according to the process of the invention.

After preparing the aqueous solution comprising gelatin, sugar, and any additional materials desired according to the above disclosure, the solution is then dried as by vacuum drum drying, spray drying conventionally or in the form of a foam, or by other suitable means which preferably produce a low density product.

In vacuum drum drying, the solution is applied to a thin layer to the surface of a suitable dryer, such as the Buflovak double drum vacuum drum dryer or vacuum drum dryer of similar type. Typically, the thickness of the layer will be within the range of from about 0.1 to about 2.0 millimeters. The surface of the dryer is preferably heated from the reverse side by steam to a temperature effective for drying the solution within a commercially practical period of time while maintaining the gelatin to the amorphous state. Typically, the residence time of the solution on the drying surface from the time of application to the time of complete drying will be from about 1 minute to about 5 minutes, preferably from about 90 seconds to 2.5 minutes. Steam at a pressure of from about 10 to about 60 psig will be effective for supplying adequate heat. More typically, the steam pressure will be within the range of from about 15 to about 30 psig.

The solution is dried on the vacuum drum drying surface under a reduced pressure. Absolute pressures of less than about 5 inches of mercury are effective. The reduced pressure causes rapid volatilization of the water within the solution and creates a light, friable, flaky product which exhibits good cold water solubility immediately after removal from the surface by means of a knife-edged scraper blade or other suitable means. It is preferred, however, to further reduce and classify the particle size of the dried cold water soluble gelatin product to a more uniform size such as by grinding and screening. The dried material is preferably ground and classified to a particle size of from about 12 to about 100 US series mesh.

According to another embodiment, the aqueous solution comprising gelatin, sugar, and any additional materials desired according to the above disclosure, the solution is extruded as a foam and dried. The foam can be prepared by dispersing a gas within the solution prior to extrusion such that a foam is produced, or the solution can be subjected to mechanical shearing under conditions of heat and elevated pressure effective to cause expansion of the solution due to rapid volatilization of water upon exiting the closed extruder system to the atmosphere or other area having a suitably-controlled pressure to permit expansion.

According to one variation of this embodiment, the air, nitrogen, carbon dioxide or other suitable gas is aspirated into a process line containing a solution of sugar and gelatin. Then, the gas is dispersed within the solution in a manner known to the art. For example, the solution containing the gas may be passed through a gear pump which disperses the air to some extent while increasing the pressure applied to the solution. From the gear pump, the solution may then be passed through a homogenizer of the type employed in the dairy industry. Typical of these are the Manton Gaulin and Cherry Burrell two-state homogenizers. Alternatively, a high shear in-line mixing device can be employed. The particular operating conditions for these devices will be affected by the temperature of the solution as well as its total solids content, the ratio of sugar to gelatin, the presence of surface-active agents, acids, and other materials. After finely dispersing the gas within the solution, the solution can be foamed in the process line prior to exiting an extrusion orifice or it can be foamed upon exit.

According to one desirable embodiment, a spray dryer nozzle is employed to extrude the solution as a foam into finely dispersed particles. The dispersed droplets are then spray dried in conventional manner. Thus, drying air can be administered either co-currently or countercurrently with the particles of foam solution.

According to another embodiment, the solution is subjected to mechanical shear under conditions of heat and pressure within a closed system, such as that provided within an extruder designed for preparing foamed plastic materials. While it is possible to employ a liquid more volatile than water to rapidly volatilize and cause the foaming action as is accomplished in the plastics industry, the water within the solution itself is effective to provide adequate expansion. To achieve expansion, the temperature and pressure within the extruder are selected at suitable levels based upon the composition of the solution in terms of total solids, the ratio of sugar to gelatin, and the presence of other materials, to enable the water to flash off as steam upon exiting the high pressure conditions of the extruder. This flashing results in the spontaneous foaming, partial drying, and cooling of the solution as it exits the extruder. Because of the great number of variables within the solution itself, as well as in the design of conventional extruders, there is no universal set of operating ranges which can be identified as defining the operable limits according to this embodiment; however, those skilled in the art of extruding foam materials will readily be able to adapt the particular equipment desired to the preparation of foam gelatin.

After preparation of the foamed solution of gelatin and water by any of the methods above or any other suitable methods, the extruded foam is dried to a moisture content suitable for packaging or other processing. This can be achieved by the use of conventional drying ovens, such as a Proctor and Schwartz dryer. Desirably, the moisture content of the solution is controlled prior to extrusion to provide an extruded foam which is sufficiently shape retaining to permit its immediate sub-division prior to drying, to thereby speed the drying process. Alternatively, the extruded foam can be dried in stages, the first stage reducing the moisture contents sufficiently to permit sub-division, and a second and any subsequent stage being employed to provide the final drying to the desired moisture content.

Preferred bulk densities for the dry cold water soluble gelatin product of the invention will be within the range of from about 0.15 to about 0.40 grams per cubic centimeter.

The dried cold water soluble gelatin product prepared according to the process of the invention can be compounded with other typical ingredients of dry gelatin dessert mixes to prepare a gelatin dessert mix which is, itself, cold water soluble. Typically, the dry gelatin dessert mix prepared according to the invention will comprise the cold water soluble gelatin plus additional amounts of sweeteners, acidulents, buffers, flavors, and colors for the desired effect in the final product. Where these materials are not added to the solution prior to drying, they can be added by dry mixing with the cold water soluble gelatin product after drying by simple dry blending or by blending and agglomeration. Typically where the sugar is sucrose, the ratio of sucrose to gelatin will be within the range of from about 9–15:1. And, where the acid is fumaric acid, the ratio of acid to gelatin will be within the range of from about 0.18–0.30:1. The buffer will be preferably be employed in an amount effective to adjust the pH of the final product to within the range of from about 3 to about 4.5. The flavorants and colorants are used in widely varying amounts, depending upon the desired end effect. The cold water soluble gelatin dessert can also contain vitamin and mineral supplements if desired.

The following examples are intended to further illustrate and explain the present invention and are not to be taken as limiting in any regard.

EXAMPLE 1

This example describes the preparation of a cold water soluble gelatin product according to the invention. A solution for drying is prepared by admixing the following materials:

| Ingredients | Parts |
| --- | --- |
| Corn syrup solids, 42 DE | 333 |
| Maltodextrin, 20 DE | 333 |
| Pork gelatin, Type A, 250 + bloom | 111 |
| Fumaric acid | 28 |
| Polysorbate 60 | 7.28 |
| Water | 650 |

The above ingredients are mixed and heated in a kettle for 10 minutes at 155° F. while agitating by a Lightnin Mixer. The resulting solution is then cooled to 115° F. and held at this temperature. The solution, having a 60% solids content, is applied in a thin film to the inside surface of a jacketted vacuum kettle which is heated by introducing steam at a pressure of 20 psig to the jacket. The kettle is closed and the vacuum, indicated by the pressure gauge to be complete, is applied until the product becomes dried to a low-density, flaky consistency after about 90 seconds to about 2.5 minutes. The dried material is then scraped from the surface on the inside of the kettle and the process is repeated until a sufficient quantity of cold water soluble gelatin product is obtained.

EXAMPLE 2

This example illustrates the preparation of a cold water soluble dry gelatin dessert mix according to the present invention. The following ingredients are admixed:

| Ingredients | Parts |
| --- | --- |
| Cold water soluble gelatin of Example 1 | 46.88 |
| Sucrose | 36.64 |
| Sodium citrate buffer | 1.30 |
| Spray dried flavor | 0.16 |
| FD&C color | 0.04 |
| Ascorbic acid | 0.03 |

These materials are dry blended to provide a homogeneous blend to provide the cold water soluble dry gelatin dessert mix. A gelatin dessert is prepared by adding 16 fluid ounces of water to a container containing 85 grams of the cold water soluble dessert mix prepared above and stirring for 1 minute with a spoon.

EXAMPLE 3

The procedure of Example 1 is repeated, but this time the solution is adjusted to a solids content of 30% and is spray dried in a Niro Atomizer Pilot Model Spray Dryer. The solution is sprayed using a Centrifugal nozzle at a rate of 1.5 pounds per hour. The air inlet temperature is about 175° C. and the outlet temperature is about 103°0 C. When combined with the other ingredients for a gelatin dessert mix, as in Example 2, essentially complete solution in cold water is achieved after mixing in a kitchen blender.

The above description is for the purpose of teaching the person skilled in the art how to practice the present invention. This description is not intended to detail all of the obvious modifications and variations of the invention which will become apparent to a skilled worker upon reading. However, it is intended to include all such obvious modifications and variations within the scope of the invention which is defined by the following claims.

What is claimed is:

1. A process for preparing a cold water soluble gelatin product, comprising: preparing an aqueous solution comprising gelatin, sugar containing corn syrup solids and maltodextrin, the ratio of sugar to gelatin being in the range of from about 3:1 to about 7:1, acid and an amount of surface-active agent effective to increase dispersibility in the final product, and drying the solution.

2. A process according to claim 1 wherein the acid is fumaric acid.

3. A process according to claim 1 wherein the surface-active agent comprises a member selected the group consisting of polyoxyethylene (20) sorbitan monostearate, polyoxyethylene (20) sorbitan monooleate, polyoxyethylene (20) sorbitan tristearate, and mixtures of these.

4. A process according to claim 1 wherein the dried material is ground and screened to a particle size of from about 12 to about 100 US series mesh.

5. A process according to claim 1 wherein the bulk density of the cold water soluble gelatin product is within the range of from about 0.15 to about 0.40 grams per cubic centimeter.

6. A process according to claim 1 wherein the sugar additionally comprises sucrose.

7. A process according to claim 1 wherein the combined weight of corn syrup solids, and maltodextrin comprises a major amount of the sugar.

8. A process according to claim 1 wherein the solution is dried in a thin film under a partial vacuum.

9. A process according to claim 1 wherein the solution is spray dried.

10. A process according to claim 1 wherein the solution prior to drying comprises from about 20 to about 75% solids.

11. A process according to either of claims 1 or 10 wherein the ratio of the acid to the gelatin is within the range of from about 0.05–0.5:1.

12. A process according to claim 11 wherein the ratio of acid to gelatin is within the range of from about 0.18–0.28:1.

13. A cold water soluble gelatin product prepared according to the process of claim 1.

14. A gelatin dessert mix comprising: a cold water soluble gelatin product prepared according to the process of claim 1, an acid, buffer, flavor, and color.

15. A gelatin dessert mix according to claim 14 wherein the buffer is employed in an amount effective to adjust the pH of an aqueous solution of the gelatin dessert mix to a pH within the range of from about 3 to about 4.5.

16. A gelatin dessert mix according to claim 15 wherein the acid comprises fumaric acid.

17. A gelatin dessert mix according to claim 16 wherein the ration of acid to gelatin is within the range of from 0.18 to 0.28:1.

18. A gelatin dessert mix according to claim 14 wherein additional sugar is admixed to bring the total sugar to gelatin ratio within the range of from 9–15:1.

19. A gelatin dessert mix according to claim 14 wherein the cold water soluble gelatin product has a particle size within the range of from about 12 to about 100 US series mesh.

20. A gelatin dessert mix according to claim 14 wherein cold water soluble gelatin product has a bulk density of from about 0.15 to about 0.40 grams per cubic centimeter.

21. A gelatin dessert mix according to claim 14 which is capable of completely dissolving in 55° F. water in less than one minute by stirring with a spoon.

* * * * *